United States Patent
Gupta (10) Patent No.: US 10,822,935 B2
(45) Date of Patent: Nov. 3, 2020

(54) METHOD OF TREATING A SUBTERRANEAN FORMATION WITH NATURAL GAS

(71) Applicant: Baker Hughes, a GE company, LLC, Houston, TX (US)

(72) Inventor: D. V. Satyanarayana Gupta, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 51 days.

(21) Appl. No.: 15/994,847

(22) Filed: May 31, 2018

(65) Prior Publication Data

US 2018/0291719 A1   Oct. 11, 2018

Related U.S. Application Data

(63) Continuation-in-part of application No. 14/186,643, filed on Feb. 21, 2014, now Pat. No. 10,012,062.

(60) Provisional application No. 61/772,060, filed on Mar. 4, 2013.

(51) Int. Cl.
| | |
|---|---|
| *E21B 43/26* | (2006.01) |
| *C09K 8/62* | (2006.01) |
| *E21B 43/16* | (2006.01) |
| *C09K 8/70* | (2006.01) |
| *C09K 8/64* | (2006.01) |
| *C09K 8/94* | (2006.01) |
| *E21B 43/267* | (2006.01) |

(52) U.S. Cl.
CPC ............... *E21B 43/26* (2013.01); *C09K 8/64* (2013.01); *C09K 8/703* (2013.01); *C09K 8/94* (2013.01); *E21B 43/168* (2013.01); *E21B 43/267* (2013.01)

(58) Field of Classification Search
CPC ...... E21B 43/166; E21B 43/168; E21B 43/26; C09K 8/62
See application file for complete search history.

(56) References Cited

U.S. PATENT DOCUMENTS

| | | |
|---|---|---|
| 3,822,747 A | 7/1974 | Maguire, Jr. |
| 4,569,394 A | 2/1986 | Sweatman |
| 5,002,125 A | 3/1991 | Phillips |
| 5,417,287 A | 5/1995 | Smith et al. |
| 5,571,315 A | 11/1996 | Smith et al. |
| 5,614,010 A | 3/1997 | Smith et al. |

(Continued)

FOREIGN PATENT DOCUMENTS

| | | |
|---|---|---|
| WO | 2012097425 | 7/2012 |
| WO | 2017058484 | 4/2014 |

(Continued)

OTHER PUBLICATIONS

R.E. Hurst; "Gas Frac—A New Stimulation Technique Using Liquid Gases"; SPE 3837; 1972; pp. 1-7; Society for Petroleum Engineers, Dallas, Texas.

(Continued)

*Primary Examiner* — Kenneth L Thompson
(74) *Attorney, Agent, or Firm* — John Wilson Jones; Jones Delflache LLP (57) ABSTRACT

A fracturing method wherein a foamed or energized fluid comprising natural gas is introduced into a subterranean formation to enhance or create fractures and to enhance production of hydrocarbons from a reservoir penetrated by a wellbore.

16 Claims, 5 Drawing Sheets

(56) References Cited

U.S. PATENT DOCUMENTS

| | | | |
|---|---|---|---|
| 5,647,900 A | 7/1997 | Smith et al. | |
| 6,138,760 A | 10/2000 | Lopez et al. | |
| 6,269,656 B1 | 8/2001 | Johnston | |
| 6,302,209 B1 | 10/2001 | Thompson, Sr. et al. | |
| 6,517,286 B1 | 2/2003 | Latchem | |
| 6,602,828 B2 | 8/2003 | Amin et al. | |
| 6,849,581 B1 | 2/2005 | Thompson et al. | |
| 7,293,611 B2 | 11/2007 | Taylor et al. | |
| 7,341,103 B2 | 3/2008 | Taylor et al. | |
| 7,475,730 B2 | 1/2009 | Brown et al. | |
| 7,565,933 B2* | 7/2009 | Kippie | E21B 43/122 166/372 |
| 7,584,793 B2 | 9/2009 | Brown | |
| 7,718,582 B2 | 5/2010 | Le et al. | |
| 7,913,762 B2 | 3/2011 | Wheeler et al. | |
| 7,918,281 B2 | 4/2011 | Brown et al. | |
| 7,989,398 B2 | 8/2011 | Bland et al. | |
| 8,084,401 B2 | 12/2011 | Lukocs et al. | |
| 8,196,660 B2 | 6/2012 | Smith | |
| 8,312,924 B2 | 11/2012 | Smith | |
| 8,342,246 B2 | 1/2013 | Vandor | |
| 8,371,383 B2 | 2/2013 | Bell et al. | |
| 8,443,890 B2 | 5/2013 | Hoch | |
| 8,614,171 B2 | 12/2013 | Hoch | |
| 9,181,789 B2* | 11/2015 | Nevison | E21B 43/26 |
| 9,291,045 B2 | 3/2016 | Wheeler et al. | |
| 9,676,994 B2 | 6/2017 | Kuipers | |
| 9,790,775 B2* | 10/2017 | Joseph | E21B 43/26 |
| 10,012,062 B2* | 7/2018 | Gupta | C09K 8/565 |
| 2005/0277554 A1 | 12/2005 | Blauch | |
| 2006/0065400 A1 | 3/2006 | Smith | |
| 2006/0096756 A1 | 5/2006 | Weiss | |
| 2009/0038242 A1 | 2/2009 | Cope | |
| 2010/0101796 A1 | 4/2010 | Leshchyshyn et al. | |
| 2011/0143971 A1 | 6/2011 | Mesher et al. | |
| 2011/0245114 A1 | 10/2011 | Gupta et al. | |
| 2011/0284230 A1 | 11/2011 | Loree et al. | |
| 2012/0000660 A1 | 1/2012 | Gatlin et al. | |
| 2012/0037371 A1 | 2/2012 | Gupta et al. | |
| 2013/0137609 A1 | 5/2013 | Pierce | |
| 2013/0341010 A1 | 12/2013 | Nevison | |
| 2014/0000899 A1 | 1/2014 | Nevison | |
| 2014/0008074 A1 | 1/2014 | Nevison | |
| 2014/0034322 A1 | 2/2014 | Gupta | |
| 2014/0246199 A1 | 9/2014 | Gupta | |
| 2014/0251626 A1 | 9/2014 | Gomma | |
| 2015/0101807 A1 | 4/2015 | Kuipers | |
| 2018/0238153 A1* | 8/2018 | Nevison | C09K 8/38 |
| 2019/0338626 A1* | 11/2019 | Stephenson | E21B 43/168 |

FOREIGN PATENT DOCUMENTS

| | | |
|---|---|---|
| WO | 2016064645 | 4/2016 |
| WO | 2017058487 | 4/2017 |

OTHER PUBLICATIONS

D.V. Gupta; "Unconventional Fracturing Fluids for Tight Gas Reservoirs": SPE 119424; 2009; pp. 1-9; Society of Petroleum Engineers; The Woodlands Texas.

R.E. Hurst; Use of Liquified Gases As Fracture Fluids for Dry Gas Reservoirs: SPE 4116; 1972; pp. 1-12; Society for Petroleum Engineers; Dallas Texas.

Kale Webster; "Current Completion Practices in Tight Reservoirs"; SPE 6379; 1977; pp. 93-100; Society for Petroleum Engineers; Dallas, Texas.

PCT search report and written opinion in corresponding PCT application No. PCT/US2019/034865 filed May 31, 2019.

\* cited by examiner

FIG. 1

Wellsite 400

METHOD OF TREATING A SUBTERRANEAN FORMATION WITH NATURAL GAS

This application is a continuation-in-part application of U.S. patent application Ser. No. 14/186,643, filed on Feb. 21, 2014 which claims the benefit of U.S. patent application Ser. No. 61/772,060, filed on Mar. 4, 2013, both of which are herein incorporated by reference.

FIELD OF THE INVENTION

The disclosure relates to a method of enhancing the productivity of a hydrocarbon-bearing subterranean formation with natural gas.

BACKGROUND OF THE INVENTION

A common method of increasing productivity of a hydrocarbon-bearing formation penetrated by a well is to subject the formation to stimulation techniques, such as hydraulic fracturing. Fracturing of a subterranean formation is accomplished by pumping a fracturing fluid into the well which penetrates the formation. Once natural reservoir pressures are exceeded, the confining stresses in the formation cause the formation to fail, thereby inducing a fracture. The fracturing fluid typically contains a proppant to prop open fractures. The propped fracture provides larger flow channels through which an increased quantity of a hydrocarbon may flow. Productive capability of the well is therefore increased.

In a typical hydraulic fracturing operation, the fracturing fluid is aqueous and contains a water-soluble polymer. The viscosity of the fluid is increased upon hydration of the polymer. Fluid viscosity is further increased by the presence of crosslinking agents in the fluid which interact with the water-soluble polymer to form a crosslinked gel. Typical water-soluble polymers include underivatized guar, guar derivatives, cellulosic derivatives, xanthan and carrageenan. Commonly used crosslinking agents are those capable of providing borate ions as well as those agents which contain a metal ion such as aluminum, zirconium and titanium. Such viscosified fluids form three-dimensional gels. The fluid is of sufficient viscosity to adequately carry and place proppant into fractures within the formation.

Aqueous-based fracturing fluids are known to damage well formations due to adverse water saturation effects. Such effects may include sub-irreducible water saturation. Water retention issues may be especially acute in tight gas formations which are water-wet and under-saturated where the initial water saturation in the reservoir is less than the capillary equilibrium irreducible water saturation. When exposed to aqueous based fluids, these formations will trap water for long periods of time, if not permanently, especially in the near-wellbore region of the well. The saturation of the formation with water can result in reduced permeability to hydrocarbons, which in turn can cause reduced productivity of the well. Fluids of reduced water content, including non-aqueous fluids, are often preferred in the fracturing of water-sensitive formations.

Non-aqueous fluids are further often preferred in fracturing operations at well sites where water is unavailable or only available in limited quantities. Further, certain formation, such as tight gas formations, flow back 25 to 40% of fracturing water which has to be handled prior to putting the produced gas on pipeline. Non-aqueous fracturing fluids minimize the concern of flowback water.

An example of a fracturing fluid of low water content is foam. As such, foam is often used in the treatment of water sensitive formations. In foam fracturing, a foam is generated on the surface and is then injected under pressure into the formation. Typically, foam is generated on the surface by combining nitrogen gas or carbon dioxide with an aqueous fluid. This allows for a reduction in the amount of water without loss of treatment fluid volume. Suitable gases include nitrogen and carbon dioxide. In some cases, a mixture of such gases may be used. A mixture of two of such gases is referred to as a binary composition. Once the desired fracturing is achieved, pressure is released at the well head causing the foam to expand and exit the well. Like linear gels, however, it is not uncommon for such treatment fluids to be undesirable because of risk of fluid leak-off to the formation.

Typically, when the amount of gas in the fracturing fluid exceeds 30% by volume, a foaming agent is added to create a foamed fluid. The addition of a foam typically increases the viscosity of the treatment fluid. Where the amount of gas and/or foaming agent in the treatment fluid is less than 53 volume percent, the fluid is "energized". Where the amount of gas and foaming agent in the treatment fluid is 53 volume percent or greater, the fluid is a "foamed fluid". In addition to increasing viscosity, the foaming agent further contributes to the stability of the resulting fluid.

At times, an aqueous based foam is unacceptable in the treatment of water sensitive formations as crosslinking agents are often less effective in the presence of certain foaming agents, such as alpha olefin sulfonates. The ultimate effect is a substantial loss of foam viscosity. While loss in viscosity may be overcome by the addition of greater amounts of crosslinking agent, the amount of additional crosslinking agent which must be added is often staggering. For instance, in some cases, the concentration of crosslinking agent must be increased by 300%. This, in turn, causes a substantial increase in the treatment cost.

Further, limitations on available space at the wellsite may present major problems on the use of foaming gases. For instance, successful fracturing of tight gas formations, such as shale, requires an enormous amount of treatment fluid. The use of nitrogen and carbon dioxide at such locales is often difficult or not possible since containment of such gases requires a large amount of platform space. Alternatives have therefore been sought.

In the past, liquid carbon dioxide has been used as a non-aqueous fracturing fluid as well as liquid petroleum gas (LPG). Carbon dioxide, however, is not available in all locations. In addition, after completion of a fracturing operation, the amount of carbon dioxide in the produced fluid typically has to be minimized before produced fluids can start to flow through the pipeline. LPG based fracturing fluids have been operationally successful; however, they carry inherent safety issues.

Alternative fracturing fluids have therefore been desired which minimize environmental and safety risks and which address the complexities presented during fracturing procedures.

SUMMARY OF THE INVENTION

An embodiment of the present disclosure is directed is to a gelled non-aqueous fracturing fluid which contains liquefied natural gas (LNG) or natural gas.

In one embodiment, the fracturing fluid containing LNG or natural gas is gelled with a phosphate ester.

Another embodiment is directed to a method for enhancing the productivity of a hydrocarbon-bearing formation penetrated by a gas producing well by introducing into the gas producing well a gelled non-aqueous fluid containing LNG or natural gas.

In an embodiment, the gelled non-aqueous fluid containing LNG or natural gas is introduced into an onshore gas producing well.

In another embodiment, the disclosure is directed to a method for enhancing the production of hydrocarbons from a hydrocarbon-bearing formation by introducing into a well penetrating the formation a gelled fracturing fluid containing LNG or natural gas.

In another embodiment, the disclosure is directed to a method for enhancing the production of hydrocarbons from a hydrocarbon-bearing formation by introducing into a well penetrating the formation a fracturing fluid containing LNG or natural gas and a phosphate ester.

In another embodiment, the disclosure is directed to a method for fracturing a gas producing well penetrating a subterranean hydrocarbon-bearing formation by supplying LNG or natural gas to the well through a flowline extending from another producing well.

In another embodiment, the disclosure is directed to a method for fracturing an onshore gas producing well penetrating a subterranean hydrocarbon-bearing formation by supplying LNG or natural gas to the well from a field gathering plant.

In another embodiment, the disclosure is directed to a method for fracturing a gas producing well by supplying LNG or natural gas to an onshore well through a pipeline which is plumbed to the wellsite of the gas producing well.

In still embodiment, the disclosure is directed to a method for fracturing a gas producing well penetrating a subterranean hydrocarbon-bearing formation by transferring LNG from a storage tank on the wellsite of the gas producing well.

In yet embodiment, the disclosure is directed to a method for fracturing a gas producing well penetrating a subterranean hydrocarbon-bearing formation by supplying LNG or natural gas transported to a storage tank from a source distant from the wellsite.

Still, the disclosure is directed to a method for fracturing an onshore gas producing well penetrating a subterranean hydrocarbon-bearing formation by supplying LNG or natural gas to the well from a tanker located at the wellsite.

In another embodiment, the disclosure is drawn to a method of treating a subterranean formation penetrated by a well wherein a foamed or energized fluid is formulated by mixing natural gas and a non-aqueous based fluid or aqueous based fluid. The foamed or energized fluid is then introduced into the subterranean formation.

In another embodiment, a method for enhancing productivity of a hydrocarbon-bearing formation penetrated by a well is provided wherein foam having a foam quality from 53 to about 99.9, more typically to about 99.5, volume percent is introduced into the hydrocarbon-bearing subterranean formation, the foam comprising natural gas as foaming agent.

In yet another embodiment, a method for enhancing the productivity of a hydrocarbon-bearing formation penetrated by a well is provided wherein natural gas is pumped into the well at the wellhead to create or enlarge a fracture in the hydrocarbon-bearing formation, the natural gas being supplied to the wellhead either from a producing well via a flowline extending from the producing well to the well penetrating the hydrocarbon-bearing formation; a field gathering plant; a pipeline plumbed to the wellsite of the well penetrating the hydrocarbon-bearing formation; a storage tank on the wellsite of the well penetrating the subterranean formation; or a central gathering unit.

In still another embodiment, a method for enhancing productivity of a hydrocarbon-bearing formation penetrated by a well is provided wherein a mixture of natural gas and an aqueous based or non-aqueous based fluid comprising a gellant is first prepared. The blend is then pumped into the well under pressure, the pressure being sufficient to create or enlarge a fracture in the subterranean formation.

In yet another embodiment relates to a method of fracturing a subterranean formation wherein a fracturing fluid is pumped into the formation at a pressure sufficient to create or enlarge a fracture, the fracturing fluid prepared by mixing (i) natural gas, (ii) an aqueous based or non-aqueous based fluid comprising a gellant, and (iii) proppant at the wellsite of the well.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Illustrative embodiments of the disclosure are described below as they might be employed in the operation and treatment of well applications. In the interest of clarity, not all features of an actual implementation are described in this specification. It will of course be appreciated that in the development of any such actual embodiment, numerous implementation and/or specific decisions must be made to achieve the specific goals of the operator, which will vary from one implementation to another. Moreover, it will be appreciated that such a development effort might be complex and time-consuming but may nevertheless be a routine undertaking for those of ordinary skill in the art having the benefit of this disclosure. Further aspects and advantages of the various embodiments of the disclosure will become apparent from consideration of the following description.

As used herein, the term "introducing" includes pumping, injecting, pouring, releasing, displacing, spotting, circulating or otherwise placing a material within the well or borehole using any suitable method known in the art.

The productivity of a hydrocarbon-bearing formation may be enhanced by introducing liquefied natural gas (LNG) or natural gas into a well and into the formation penetrated by the well. LNG originates from natural gas and is composed predominately of methane. It may include gaseous hydrocarbons and/or atmospheric gases normally found in liquefied methane-based products generally referred to as natural gas. An exemplary mixture of LNG may be from about 75 to about 95 vol. % liquefied methane, from about 5 to about 15 vol. % ethane, with the remainder being propane and butane.

In a preferred embodiment, the fluid containing natural gas or LNG may be introduced into the formation at a pressure sufficient to create or enlarge a fracture.

In a preferred embodiment, the well may be an oil well or gas well. The subterranean formation may be a coal bed. In a preferred embodiment, the subterranean formation is a tight gas formation, such as shale.

The natural gas may be a component of an energized fluid or a foamed fluid. Energized or foamed fluids are particularly applicable to under-pressured gas reservoirs and wells which are rich in swellable and migrating clays.

The foamed or energized fluid may be prepared by adding natural gas to a non-aqueous based fluid or an aqueous based fluid. The foam quality of the foamed or energized fluid may be between from about 30 to about 99.9 volume percent, in some cases between from about 30 to about 99.5 volume percent, in some cases from about 30 to about 98.5 volume percent.

The foamed or energized fluid may be prepared using a gellant and/or non-gaseous foaming agent. Further, the foamed or energized fluid may contain proppant or proppant may be added to the foamed or energized fluid prior to introduction of the fluid into the well.

In an embodiment, a foam comprising natural gas as foaming agent and having a foam quality from 53 to about 99.9 volume percent (more typically to about 99.5 volume percent and even more typically to about 98 volume percent) may be introduced into the hydrocarbon-bearing subterranean formation penetrated by a well.

In another embodiment, an energized fluid of natural gas and having a foam quality less than 53 volume percent may be introduced into the well.

In an embodiment, the natural gas used in the fracturing operation is compressed and the compressed gas is then introduced into the wellhead. In an embodiment, natural gas may be compressed to as much as 1% of the volume it occupies at standard atmospheric pressure. When compressed, the gas may be contained at a pressure of 20-25 MPa (2,900-3,600 psi).

When added to an aqueous base, the fluid may contain a water-based or water-soluble viscosifying agent as gellant.

Suitable water-based gellants include galactomannan gums, cellulose, cellulosic derivatives, starch, starch derivatives, xanthan, derivatized xanthan, carrageenan and mixtures thereof.

In a preferred embodiment, the aqueous fluid contains at least one hydratable crosslinkable polymer. Preferred crosslinkable polymers are polysaccharides, such as galactomannans, cellulosic derivatives and starch and mixtures thereof.

Suitable cellulosic derivatives include (1) hydroxyalkyl celluloses like hydroxyethyl cellulose, hydroxypropyl cellulose, hydroxybutyl cellulose, hydroxyethylmethyl cellulose, hydroxypropylmethyl cellulose and hydroxybutylmethyl cellulose; (2) alkylhydroxylalkyl cellulose like methylhydroxyethyl cellulose, methylhydroxypropyl cellulose and ethylhydroxyethyl cellulose; (3) carboxyalkylhydroxy celluloses like carboxymethyl hydroxyethyl cellulose (CMHEC); and (4) carboxyalkyl celluloses like carboxymethyl cellulose (CMC) and carboxyethyl celluloses well as mixtures thereof.

Suitable galactomannans include underivatized guar and guar derivatives such as hydroxyalkylated guars like hydroxypropyl guar, hydroxyethyl guar and hydroxybutyl guar and modified hydroxyalkylated guars like carboxymethylhydroxypropyl guar, preferably those having a molecular weight of about 1 to about 3 million. Suitable galactomannan gums include hydroxypropyl guar, carboxymethylhydroxypropyl guar and underivatized guar. The carboxyl content of the such hydratable derivatives may be expressed as Degree of Substitution ("DS") and ranges from about 0.08 to about 0.18 and the hydroxypropyl content may be expressed as Molar Substitution (MS) (defined as the number of moles of hydroxyalkyl groups per mole of anhydroglucose) and ranges between from about 0.2 to about 0.6. Further suitable guar derivatives include carboxylated guar derivatives such as carboxymethyl guar (CMG).

The xanthan may be an unmodified xanthan gum, non-acetylated xanthan gum, non-pyruvylated xanthan gum or non-acetylated-non-pyruvylated xanthan gum.

Other suitable hydratable polysaccharides include carrageenan, gum Arabic, tara gum, gum ghatti, karaya, tragacanth, pectin, starch, locust bean gum, succinoglycan, scleroglucan, tamarind and derivatives thereof.

The hydratable polymer may further be a synthetic or natural polymer including those containing one or more functional groups, such as a hydroxyl, carboxyl, sulfate, sulfonate, amino or amido group. Preferred synthetic and natural polymers include polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Further, the gellant of the aqueous based fluid may be a viscoelastic surfactant such as those disclosed in U.S. Pat. Nos. 6,491,099; 6,435,277; 6,410,489; and 7,115,546. Suitable viscoelastic surfactants include cationic, amphoteric and anionic surfactants and are also those set forth in U.S. Pat. Nos. 6,875,728 and 6,410,489, herein incorporated by reference.

Suitable viscoelastic surfactants include those containing an anionic surfactant and a cationic surfactant. A preferred viscoelastic surfactant is the combination of sodium xylene sulfonate, as anionic surfactant, and N,N,N-trimethyl-1-octadecammonium chloride, as cationic surfactant. Such viscoelastic surfactants are set forth in U.S. Pat. No. 6,468,945, herein incorporated by reference. The volume ratio of anionic surfactant:cationic surfactant is from about 1:4 to about 4:1.

Other suitable surfactant based gelled systems are those fluids which contain a $C_{10}$ to $C_{24}$ alkyl trialkyl quaternary ammonium aromatic salt admixed with an anionic surfactant, such as sodium xylene sulfonate. Such systems include those set forth in U.S. Patent Publication No. 20040138071, herein incorporated by reference. Typically, the volume ratio of cationic surfactant:anionic surfactant of such viscoelastic surfactants is between from about 1:1 to about 3:1. The alkyl group forming the alkylated moiety can be a $C_{10}$ to $C_{24}$ alkyl group, preferably a $C_{12}$ to a $C_{20}$ alkyl. In a most preferred embodiment, the alkyl group forming the alkylated moiety is a $C_{18}$ alkyl. The aromatic salt is preferably an aromatic salicylate or phthalate. The trialkyl moiety contains preferably from $C_1$ to $C_4$ alkyl groups, most preferably methyl. In a preferred mode, the surfactant is a gelled $C_{18}$ trimethyl quaternary ammonium phthalate or a gelled $C_{18}$ trimethyl quaternary ammonium salicylate.

Such $C_{10}$ to $C_{24}$ alkyl trialkyl quaternary ammonium aromatic salts may be formed by mixing a $C_{10}$ to $C_{24}$, preferably a $C_{18}$, alkyl trialkyl quaternary ammonium chloride with an alkali aromatic salt, such as a sodium salt of either salicylic acid or phthalic acid.

Further, the viscoelastic surfactant may be generated from an amidoamine oxide gelling agent, such as an amidoamine oxide of the structural formula:

wherein $R_1$ is a saturated or unsaturated, straight or branched chain aliphatic group of from about 7 to about 30 carbon atoms, preferably from about 14 to about 21 carbon atoms. More preferably, $R_1$ is a fatty aliphatic derived from natural fats or oils having an iodine value of from about 1 to about 140, preferably from about 30 to about 90, and more preferably from 40 to about 70. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, tall oil alkyl, hardened tall oil alkyl, coco alkyl, oleyl, or soya alkyl. $R_2$ is a straight chain or branched, substituted or unsubstituted divalent alkylene group of from 2 to about 6 carbon atoms, preferably, of 2 to 4 carbon atoms and more preferably of 3 carbon atoms. $R_3$ and $R_4$ are the same or different and are independently selected from alkyl or hydroxyalkyl groups of from 1 to about 4 carbon atoms and are preferably hydroxyethyl or methyl. Alternatively, $R_3$ and $R_4$ in the amidoamine oxide of formula L together with the nitrogen atom to which these groups are bonded, form a heterocyclic ring of up to 6 members. Finally, $R_5$ is hydrogen or a $C_1$-$C_4$ alkyl or hydroxyalkyl group. Such gelling agents are disclosed in U.S. Patent Publication No. US Pat Pub. No. 2005/0067165, herein incorporated by reference.

In another embodiment, the viscoelastic surfactant could be (a) an amine corresponding to the formula $N(R_1R_2R_3)$ wherein $R_1$ is at least about a $C_{16}$ aliphatic group which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ and/or $R_3$ group more hydrophilic; (b) salts of the amine corresponding to the formula $[N(R_1)(R_2)(R_3)(H^+)]X^-$ wherein $R_1$, $R_2$ and $R_3$ are the same as defined hereinbefore and $X^-$ is an inorganic anion; and (c) a quaternary ammonium salt of the amine corresponding to the formula $[N(R_1)(R_2)(R_3)(R_4^+)]X^-$ wherein $R_1$, $R_2$, $R_3$ and $X^-$ are the same as defined hereinbefore and $R_4$ independently constitutes a group which has previously been set forth for $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic 5- or 6-member ring structure which includes the nitrogen atom of the amine.

Further, the viscoelastic surfactant may be a betaine, such as those of the formula:

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Most preferably the surfactant is the betaine in which R is $C_{17}H_{33}$ or $C_{21}H_{41}$, and n=3 and p=1.

Still further, the viscoelastic surfactant may be a surfactant of the formula $N^+(R_1)(R_2)(R_3)(CH_2COO^-)$ where $R_1$-$R_2$ are each an aliphatic group of $C_1$-$C_4$, branched or straight chained, saturated or unsaturated, $R_3$ is a group of $C_{12}$-$C_{22}$, branched, straight chained or cyclic, saturated or unsaturated.

The viscoelastic surfactant may further be of the formula $N^+(CH_3)_2$ $(R_3)(CH_2COO^-)$ wherein $R_3$ is an alkyl group, alkylene group or acyl group containing between from about 16 to about 24 carbon atoms.

When present, the amount of gellant in the aqueous based or non-aqueous based fluid is typically greater than 50% by volume and more preferably at least 65% by volume.

Further, a non-gaseous foaming agent may be used in conjunction with the natural gas to ensure the desired foam quality. The use of a foaming agent is especially desirable in the treatment of substantially depleted reservoirs where the amount of hydratable polymeric viscosifying agent which may be introduced into the formation may be dramatically minimized.

Suitable non-gaseous foaming agents include amphoteric, cationic as well as anionic foaming agents.

Suitable amphoteric foaming agents include alkyl betaines, alkyl sultaines and alkyl carboxylates.

Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Preferred as alpha-olefin sulfonates are salts of a monovalent cation such as an alkali metal ion like sodium, lithium or potassium, an ammonium ion or an alkyl-substituent or hydroxyalkyl substitute ammonium in which the alkyl substituents may contain from 1 to 3 carbon atoms in each substituent. The alpha-olefin moiety typically has from 12 to 16 carbon atoms.

Preferred alkyl ether sulfates are also salts of the monovalent cations referenced above. The alkyl ether sulfate may be an alkylpolyether sulfate and contains from 8 to 16 carbon atoms in the alkyl ether moiety. Preferred as anionic surfactants are sodium lauryl ether sulfate (2-3 moles ethylene oxide), $C_8$-$C_{10}$ ammonium ether sulfate (2-3 moles ethylene oxide) and a $C_{14}$-$C_{16}$ sodium alpha-olefin sulfonate and mixtures thereof. Especially preferred are ammonium ether sulfates.

Suitable cationic foaming agents include alkyl quaternary ammonium salts, alkyl benzyl quaternary ammonium salts and alkyl amido amine quaternary ammonium salts.

Preferred as foaming agent are alkyl ether sulfates, alkoxylated ether sulfates, phosphate esters, alkyl ether phosphates, alkoxylated alcohol phosphate esters, alkyl sulfates and alpha olefin sulfonates.

Natural gas and LNG may be supplied to the well by a number of sources. For instance, natural gas and LNG may be supplied to the well from one or more secondary wells through a flowline(s) or from a field gathering plant. Alternatively, natural gas and LNG may be supplied through a pipeline which is plumbed to the wellsite of the gas producing well.

In a preferred embodiment, the non-aqueous fracturing fluid containing natural gas or LNG further contains a gellant. The fracturing fluid may be gelled with any gelling agent known in the art to be suitable for gelling non-aqueous based wellbore fluids. In a preferred embodiment, the gelling agent is an oil-based gellant.

Preferably, the gellant comprises a phosphate ester gelling agent. Suitable gellants include those set forth in U.S. Pat. Nos. 5,190,675; 5,417,287; 5,514,645; 5,571,315; 5,614,010; 5,647,900; 6,184,184; 6,602,828; and 8,084,401, all of which are herein incorporated by reference.

Suitable gellants include mono-, di- or tri-alkyl phosphate ester.

Preferred as phosphate esters are those prepared from a primary $C_5$-$C_{16}$ monohydric alcohol and a phosphate. Exemplary of such phosphate esters are mono-, di- and tri-alkyl esters, such as a mono-alkyl phosphate ester and alkyl orthophosphate acid esters.

Preferred gellants are the reaction products of an organic phosphate of the formula $HPO_4RR^1$ wherein R is an alkyl or alkaryl group having from 6 to about 18 carbon atoms and $R^1$ is hydrogen or an aryl, alkaryl or alkyl group having from 1 to about 18 carbons atoms and a ferric salt such as ferric ammonium citrate, succinate or tartrate or a lower alkyl substituted derivative thereof, optionally with an amine, such as amine of the formula $H_{3-n}N(C_mH_{2m}R^2)_n$ wherein n is an integer from 1 to 3, each m is independently an integer from 2 to 6 and $R^2$ is —H or —OH; or a polycarboxylic acid or an alkali metal salt thereof having 2 to 12 carbon atoms and/or lower alkyl and alkanol derivatives thereof including ferric amine citrate, ferric isopropanolamine citrate, ferric triethanolamine succinate and ferric dibutanolamine tartrate.

Further preferred are those gellants comprising a mixture of $PO(OR^3)(OH)_2$ and $PO(OR^3)_2(OH)$, wherein $R^3$ preferably contains from about 4 to about 16 carbon atoms and is formed by contacting phosphorus pentoxide with a mono-alkyl-, dialkyl- or tri-alkyl phosphate or a mixture thereof in the presence of an alcohol containing from about 4 to about 20 carbon atoms.

In a preferred embodiment, the gelling agent used in the non-aqueous based fluid is an oil, preferably a hydrocarbon, such as diesel fuel.

The aqueous based fluid may further contain a crosslinking agent. In aqueous based fluids, the crosslinker typically reacts with the hydratable polymer to form the gellant. Crosslinking of the polymer may occur in the presence of the natural gas and/or foaming agent.

Any crosslinking agent suitable for crosslinking the crosslinkable polymer in the aqueous fluid may be employed. Preferred crosslinking agents are those which are heat or time activated. Examples of suitable crosslinkers may also be found in U.S. Pat. Nos. 5,201,370; 5,514,309, 5,247,995, 5,562,160, and 6,110,875, incorporated herein by reference.

Where the foamed or energized fluid is prepared from natural gas and an aqueous based fluid, the crosslinking agent preferably contains a metal selected from the group consisting of aluminum, zirconium and titanium and mixtures thereof.

Where the foamed or energized fluid is prepared from natural gas and an oil based fluid, the crosslinking agent preferably contains a metal selected from the group consisting of aluminum, iron, zirconium and titanium and mixtures thereof. Exemplary of the reaction between oil-soluble gellant and crosslinking agent may be seen with phosphate esters and aluminum and iron containing crosslinking agents wherein the aluminum or ferric crosslinking agent forms an aluminum phosphate ester or ferric ester which, in turn, renders the gel.

Examples of titanium containing crosslinking agents include titanium diisopropoxide bisacetyl aminate, titanium tetra-2-ethyll hexoxide, titanium tetra-isopropoxide, titanium di-n-butoxy bistriethanol aminate, titanium isopropoxyoctylene glycolate, titanium diisopropoxybistriethanol aminate and titanium chloride.

Examples of zirconium containing crosslinking agents include zirconium ammonium carbonate, zirconium chloride, sodium zirconium lactate, zirconium oxyacetate, zirconium acetate, zirconium oxynitrate, zirconium sulfate, tetrabutoxyzirconium, zirconium monoacetyl acetonate, zirconium normal butyrate, zirconium normal propylate, zirconium glycolate and zirconium lactate triethanolamine.

Suitable aluminum-containing crosslinking agents can include, for example, aluminum lactate, aluminum citrate, or combinations thereof.

The crosslinking agent may optionally be encapsulated.

Viscous gellants may be formed by introducing the gellant, such as a phosphate ester, into a hydrocarbon based liquid and then reacting the liquid mixture in-situ with a metal activator. Conventional activators for combining with a phosphate ester include ferric ions, salts and basic iron compounds (such as ferric sulfate or ferric chloride), basic aluminum compounds (such as aluminum isopropoxide), alkali metal aluminates (such as sodium aluminate), hydrated alumina and polyvalent metal ions such as aluminum ions, gallium ions, lanthanum ions, ruthenium ions, iron ions and lanthanide rare earth series ions. Exemplary reaction products are aluminum phosphate diesters, prepared by contacting a phosphate diester gelling agent and an aluminum alkoxide activator.

The activator may also be mixed with one or more amines. Thus, the gellant may be a reaction product of a trialkyl phosphate and an activator optionally reacted with a $C_8$-$C_{18}$ surface active amine to form a reaction product to which is added a $C_2$-$C_4$ monohydric alcohol.

The treatment fluid described herein may further contain additional materials which are usually added to the combination fluid, prior to the addition of gas or gaseous liquid.

For instance, the aqueous or non-aqueous based fluids may contain water soluble and oil soluble additives, respectively. Such additives may include crosslinking delaying agents, complexing agents, gel breakers, biocides, surface tension reducing agents, scale inhibitors, corrosion inhibitors, gas hydrate inhibitors, enzyme breakers, oxidative breakers, buffers, clay stabilizers or a mixture thereof.

The use of the fluid in accordance with the invention eliminates the need for a blender on location; the simpler configuration of metering valves and pumps allowing the pumpable slurry to be diluted in-line to the desired concentration. A further benefit is the improved control of concentrations of particulates, especially since liquids are more accurately metered than solids.

The elimination of equipment on location has several economic advantages in that it saves on equipment costs and, in areas where job location space is at a premium, such as at mountainside locations, wells that were previously incapable of being stimulated become realistic targets. Further, the suspension of the invention provides the opportunity to pump the slurry concentrate from a transport located some distance from the well location versus conventional systems which require particulate transport near the blender and wellhead.

Further, the use of the fluid of the invention eliminates the need for a slurry blender, as well as fluid hydration unit, on location since a simple configuration of metering valves and a pump would allow the neat slurry to be diluted in-line with water to the desired concentration.

Figure 1:
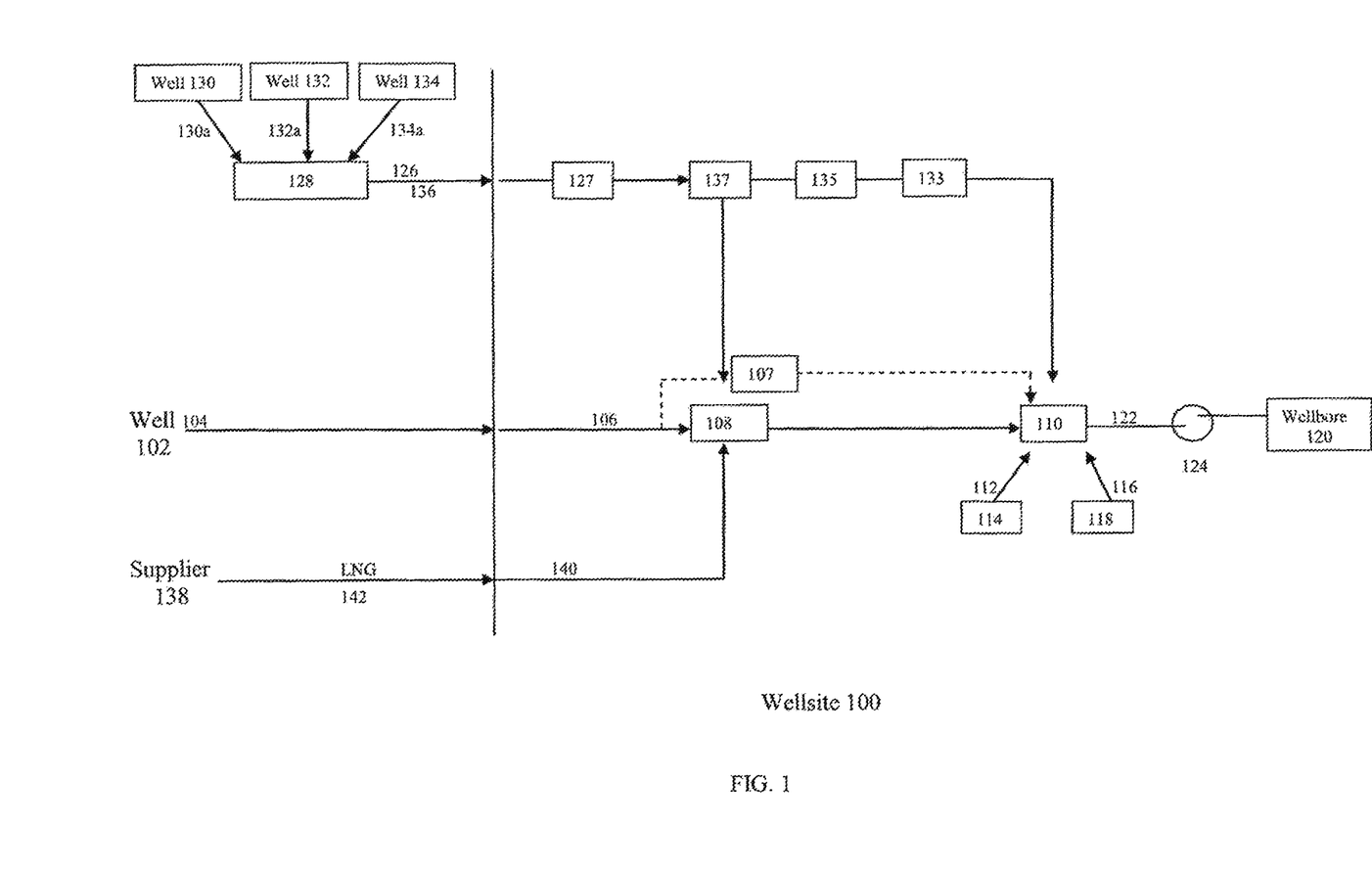
FIG. 1 depicts an embodiment of the disclosure wherein LNG or natural gas is supplied to the wellsite of a gas producing well from a field-produced natural gas source.

FIG. 1 depicts a schematic pathway for undertaking a method of fracturing on wellsite 100 of a gas producing well wherein LNG or natural gas is supplied to the wellhead 102 of the gas producing from a field-produced source. As illustrated, LNG or natural gas may be supplied to a wellsite from one or more secondary producing wells. In such instances, the LNG or natural gas may be supplied to the gas producing well through a flowline which extends from a secondary well.

As illustrated in FIG. 1, LNG or natural gas 104 produced from secondary gas well 102 may be delivered through flowline 106 to wellsite 100. Wellsite 100 may be onshore or offshore. At wellsite 100, LNG or natural gas 104 may be introduced into storage tank 108. The storage tank may be regulated by an inert tank valve for regulating the flow of LNG or natural gas. The storage tank may contain a vaporizer in order to maintain vapor pressures and reduce line pressure drops in order that higher injection rates, in excess of 30 BPM, may be obtained. In addition, controlled vapor pressure storage tanks eliminate a decreasing temperature profile on the LNG.

From storage tank 108, LNG or natural gas 104 may be metered into blender 110 containing aqueous or non-aqueous fluid where it may be admixed with gellant 112 stored in gellant storage tank 114. Proppant 116 stored in proppant storage tank 118 may also be fed into blender 110. Gellant 112 is preferably of a viscosity sufficient for delivering proppant 116 into wellhead 120.

FIG. 1 shows the blended fracturing fluid 122 being pumped from high pressure pump 124 into wellhead 120. A cryogenic pump may be used to pump the fluid into the wellhead. Wellhead isolation equipment may be mounted to the wellhead.

Alternatively, LNG or natural gas 104 may be fed through metering device 107 directly from secondary well 102 into blender 110 at wellsite 100.

LNG is converted to a gas downhole after reaching a critical temperature and pressure is reduced. Critical temperature is referred to herein as the temperature above which the LNG cannot exist as a liquid regardless of pressure. Typically, the critical temperature of LNG is between from about 100° F. to about 250° F.

Use of LNG provides for rapid clean-up and no residual liquids are left in the formation. In addition, use of LNG renders the need to flare off gases unnecessary.

Alternatively, field (unprocessed or raw) gas from one or more secondary wells may be fed through gathering line 136 from central gathering unit 128 into compressed station 137. The converted gas, now LNG, or natural gas may be introduced into storage tank 108 or fed through metering device 133 into fracturing blender 110. FIG. 1 demonstrates field gas from secondary wells 130, 132, and 134 through flowlines 130a, 132a, and 134a, respectively. Central gathering unit 128 may be in close proximity to wellsite 100 or be remote from the site. For instance, central gathering unit may be as close as 100 yards from wellsite 100 or five miles from the site.

As illustrated in FIG. 1, unprocessed or raw gas from central gathering unit 128 exiting through one or more gathering lines (shown in FIG. 1 as single flowline 136) may be fed into separator 127 to remove various components including water, dust, acid gases, helium, water and heavy hydrocarbons.

The gas may then be compressed at gathering compression unit 137. LNG is then condensed into a liquid.

The LNG or natural gas exiting gathering compression unit 137 may then be fed into field gathering storage tank 135 or storage tank 108. Alternatively, LNG or natural gas from gathering compression unit 137 may be fed through metering device 133 into fracturing blender 110.

Further, FIG. 1 also shows LNG 142 may be delivered to wellsite 100 via pipeline 140 from LNG supplier 138. Pipeline 140 is plumbed to wellsite 100. At wellsite 100, the LNG may be stored in LNG storage vessel 108. LNG may then be fed to blender 110 as needed.

It is understood that there may be one or more storage tanks for LNG or natural gas as well as one or more blenders may be presented at wellsite 100. Thus, LNG or natural gas 126 originating from central gathering 128 as well as LNG 142 originating from LNG supplier 138 may be fed into separate storage tanks for later blending. Alternatively, there may be more than one blender at wellsite 100. For instance, LNG or natural gas and LNG 142 may be fed from one or more storage tanks into one or more different blenders on wellsite 100.

Alternatively, the LNG may be supplied to a wellsite of a gas producing well in one or more bulk tankers from one or more suppliers; the LNG being off-loaded from the tanker onto one or more LNG storage tanks located at the wellsite.

Figure 2:
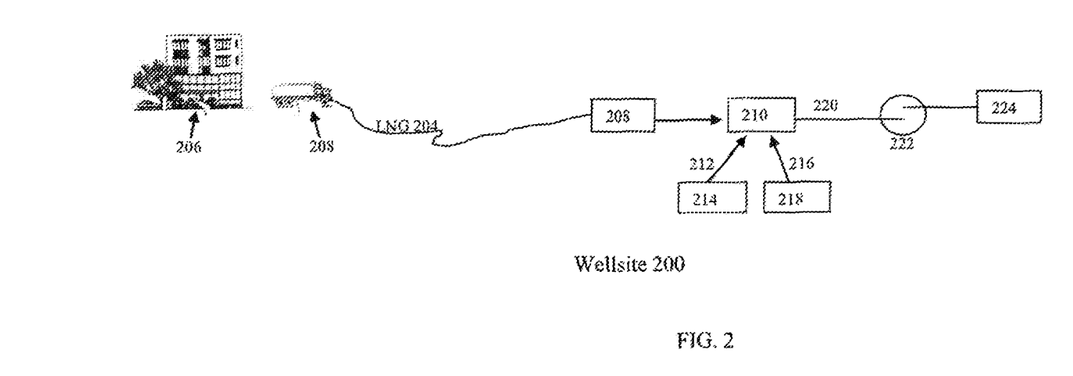
FIG. 2 depicts an embodiment of the disclosure wherein LNG or natural gas is supplied to the wellsite of a gas producing well by LNG tankers.

As depicted in FIG. 2, LNG 204 is illustrated as being supplied from LNG supplier 206. As illustrated, LNG 202 may be loaded into LNG storage tank 208 on wellsite 200. On a needed basis, LNG may be pumped into fracturing blender 210 containing aqueous or non-aqueous fluid from LNG storage tank 208. In fracturing blender 210, LNG 20 may be admixed with gellant 212 from gellant storage tank 214 and proppant 216 from proppant storage tank 218. Blended fracturing fluid 220 may then be pumped via high pressure pump 222 into wellhead 224 of the gas producing well.

It is understood that there may be one or more LNG storage tanks and fracturing blenders at wellsite 200. In addition, when a gelled fluid is desired for use, there may be one or more gellant storage tanks and proppant tanks at the wellsite. For instance, proppant from proppant tank 216 may be fed into multiple fracturing blenders or proppant from multiple proppant tanks may be fed into fracturing blender 210. Likewise, for instance, gellant from gellant tank 212 may be fed into multiple fracturing blenders or gellant from multiple gellant tanks may be fed into fracturing blender 210. Further, LNG from LNG supplier tanker 204 may be fed into multiple LNG storage tanks.

Figure 3:
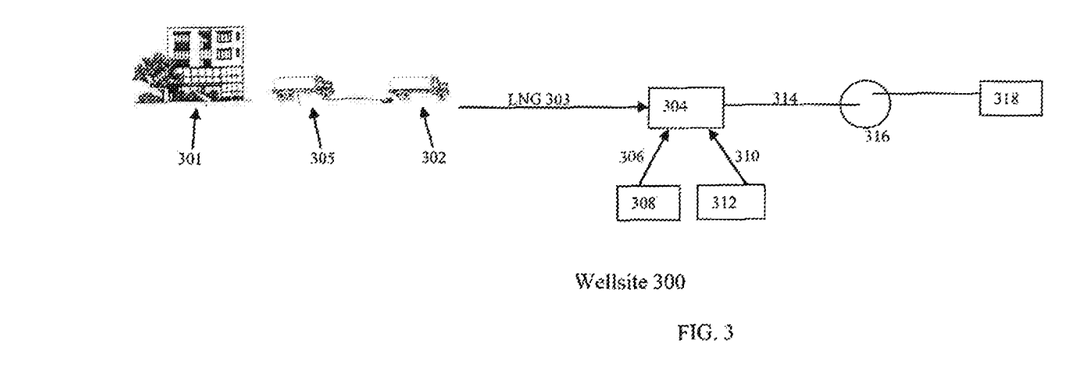
FIG. 3 depicts an embodiment of the disclosure wherein LNG or natural gas is supplied to the wellsite of a gas producing well by bulk LNG tankers located away from the wellsite.

FIG. 3 depicts an alternative arrangement wherein LNG is supplied onto wellsite 300 by supplier 301 in one or more bulk LNG tankers 305. LNG is transferred from bulk LNG tanker 305 to LNG storage tanker truck 302 at the wellsite and stored in tanker truck 302. A bulk LNG tanker is further used to carry additional or replacement LNG onto the wellsite, as needed.

As used herein, a bulk LNG tanker truck and an LNG storage tanker truck refers to a vehicle for delivery of LNG within the standards set by the U.S. Department of Transportation (DOT). The trucks are double-walled. LNG is transported at approximately −250 degrees. The vehicle has a pressurized LNG tank. The inner tanks of the trucks are made of thick aluminum designed to withstand up to 100 pounds of pressure. There is a steel outer shell around the outside of the inner tank.

The pressurized tank does not use a pump; it uses a series of relief valves to release pressure. Additionally, tank pressure is used to transfer the LNG from the tank to the storage facility.

Referring to FIG. 3, LNG storage tanker truck 302 may be located at wellsite 300 and used on-site. LNG 303 from storage tanker truck 302 may be fed into fracturing blender 304, as needed. When desired, gellant 306 may be metered from gellant storage tank 308 into fracturing blender 304 containing aqueous or non-aqueous fluid and proppant 310 may be metered from proppant storage tank 312 into fracturing blender 304.

After being mixed in fracturing blender 304, blended fracturing fluid 314 is pumped through high pressure pump 316 and enters wellhead 318.

LNG may be replenished onsite by transfer of LNG from LNG tanker truck 305 to LNG storage tanker truck 302 at the wellsite.

One or more LNG storage tanker trucks 302 may be located onsite. In addition, more than one fracturing blenders, gellant storage tanks and proppant tanks may be located at wellsite 300. For instance, proppant from proppant tank 310 may be fed into multiple fracturing blenders or proppant from multiple proppant tanks may be fed into fracturing blender 304. Likewise, gellant from gellant storage tank 308 may be fed into multiple fracturing blenders or gellant from multiple gellant tanks may be fed into fracturing blender 304.

Gas produced from the well may be directly fed into a pipeline without subjecting the produced gas to flowback treatment. The use of LNG provides for the recovery of natural gas without loss or damage to the environment. Along with being environmentally sound, the method disclosed herein is very economical.

Figure 4:
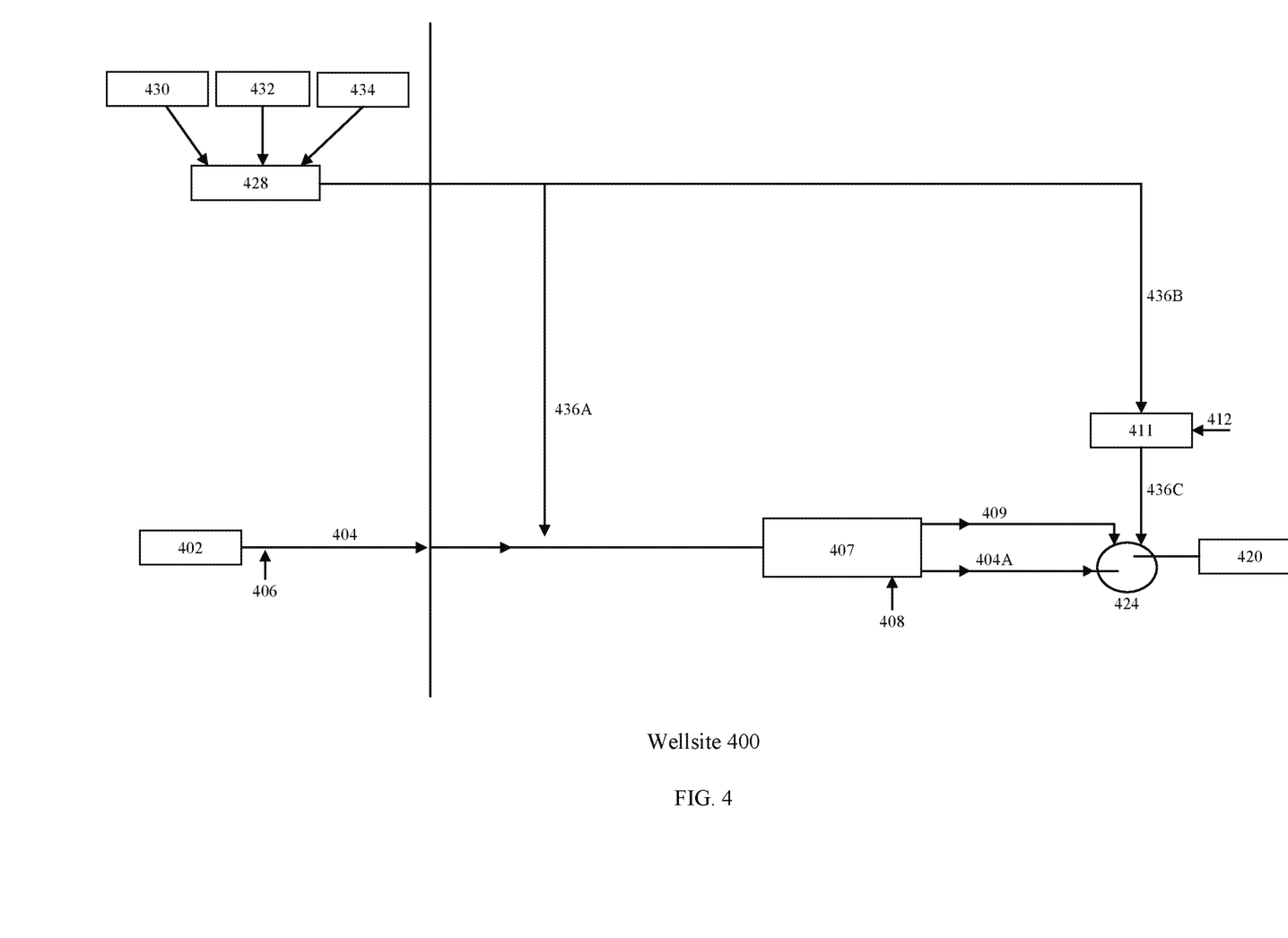
FIG. 4 illustrates the use of foamed or energized natural gas in a fracturing operation.

FIG. 4 illustrates the use of natural gas in a fracturing operation at wellsite 400 which may be onshore or offshore and wherein natural gas is supplied to the wellsite from field-produced sources of natural gas. Natural gas 404 is depicted as being supplied to wellhead 420 from field gas producing source 402. The natural gas produced may be delivered through flowline 406 to wellsite 400.

FIG. 4 shows natural gas 404 being fed into unit 407. Unit 407 may be a natural gas compressor unit wherein natural gas is compressed and then fed into wellhead 420 via pump 424 as compressed gas 404A. A cryogenic pump may be used to pump the compressed natural gas into the wellhead. Wellhead isolation equipment may be mounted to the wellhead. Alternatively, unit 407 may be a mixer for admixing natural gas 404 with a foaming agent, the foaming agent being supplied to unit 407 through feedline 408. Foamed or energized fluid 409 may then be pumped into wellhead 420 via pump 424. Further, a mixer (not shown) for mixing natural gas 404 and a foaming agent may be placed before natural gas compressor unit 407 or after natural gas compressor unit 407 to adjust the foam quality of the gas prior to pumping the gas into wellhead 420.

Natural gas may also be produced from two or more secondary sources such as gas producing well 430, gas producing well 432 and gas producing well 434. Stream 436A containing all or a portion of the natural gas collected from 430, 432 and 434 in central gathering unit 428 may be admixed with natural gas 404 originating from gas producing stream 402 and then treated in unit 407. Alternatively, stream 436B containing all or a portion of the natural gas from central gathering unit 428 may be fed into unit 411 and then pumped into wellhead 420 as stream 436C via high pressure pump 424.

Unit 411, like unit 407, may be a mixer for admixing natural gas 436B with a foaming agent through feedline 412.

Unit 411 may alternatively be a natural gas compressor unit wherein stream 436B is compressed prior to entering into pump 424. In addition, a mixer (not shown) for mixing natural gas 436B with a foaming agent may be placed before natural gas compressor unit 411 or after natural gas compressor unit 411 to adjust the foam quality of the natural gas prior to pumping the gas into wellhead 420.

Figure 5:
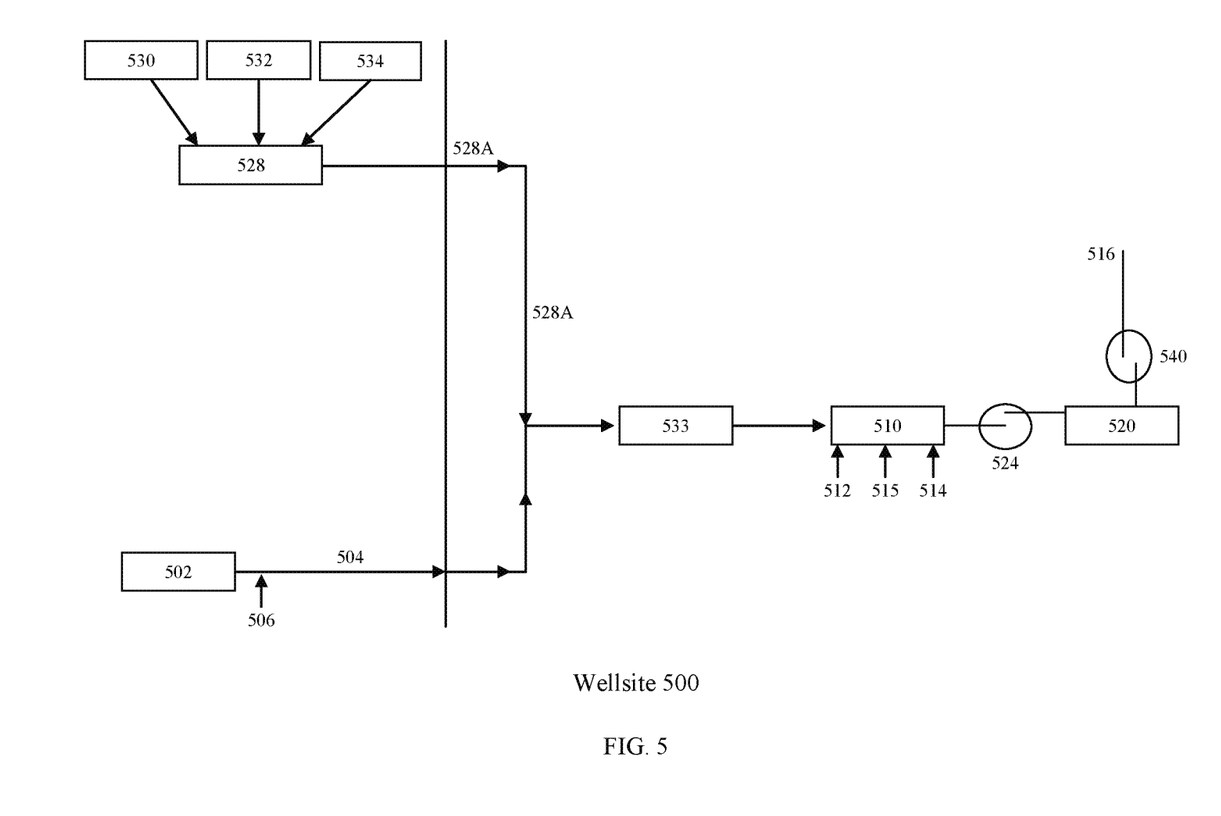
FIGS. 5 and 6 depict embodiments of the disclosure wherein natural gas is supplied to the wellsite from field-produced sources and used to produce a foamed or energized fluid for use in a fracturing operation.

FIG. 5 also illustrates a schematic pathway for fracturing where foamed natural gas or energized natural gas is prepared from an aqueous based fluid or non-aqueous based fluid containing a gellant and/or foaming agent. Natural gas is supplied to the wellhead from a field-produced source along with gellant and/or foaming agent and, optionally, proppant.

Referring to FIG. 5, natural gas 504 may be delivered from secondary gas producing well 502 through flowline 506 to onshore or off-shore wellsite 500. Natural gas may also be produced from two or more secondary sources such as gas producing well 530, gas producing well 532 and gas producing well 534 and collected in central gathering unit 528. Natural gas 528A from central gathering unit 528 may be admixed with a stream of natural gas from gas producing well 502 and fed into blender 510 via metering device 533. In blender 510, the natural gas may be admixed with an aqueous based fluid or non-aqueous based fluid containing gellant from gellant feedline 512 (the gellant may optionally be stored in a gellant storage tank, not shown, prior to being introduced into feedline 512). A foamed or energized fluid is produced in blender 510. In addition to gellant 512, or as an alternative to gellant 512, a foaming agent may be introduced into blender 510 through foaming agent feedline 515 to render the foamed gas or energized gas fluid. Proppant 514 (which may be stored in a proppant storage tank, not shown) may also be optionally fed into blender 510. The foamed or energized fluid is then fed into wellhead 520 via pump 524.

Proppant 516 which may be the same or different proppant as proppant 514 may optionally be fed directly into wellhead 520 via pump 540 where it is combined with foam or energized fluid from blender 510.

The natural gas, prior to being pumped into the wellhead, may be treated to remove water, dust, acid gases, helium, water, heavy hydrocarbons and other components. Further, natural gas may be stored in one or more storage tanks prior to feeding the gas into the wellhead.

Figure 6:
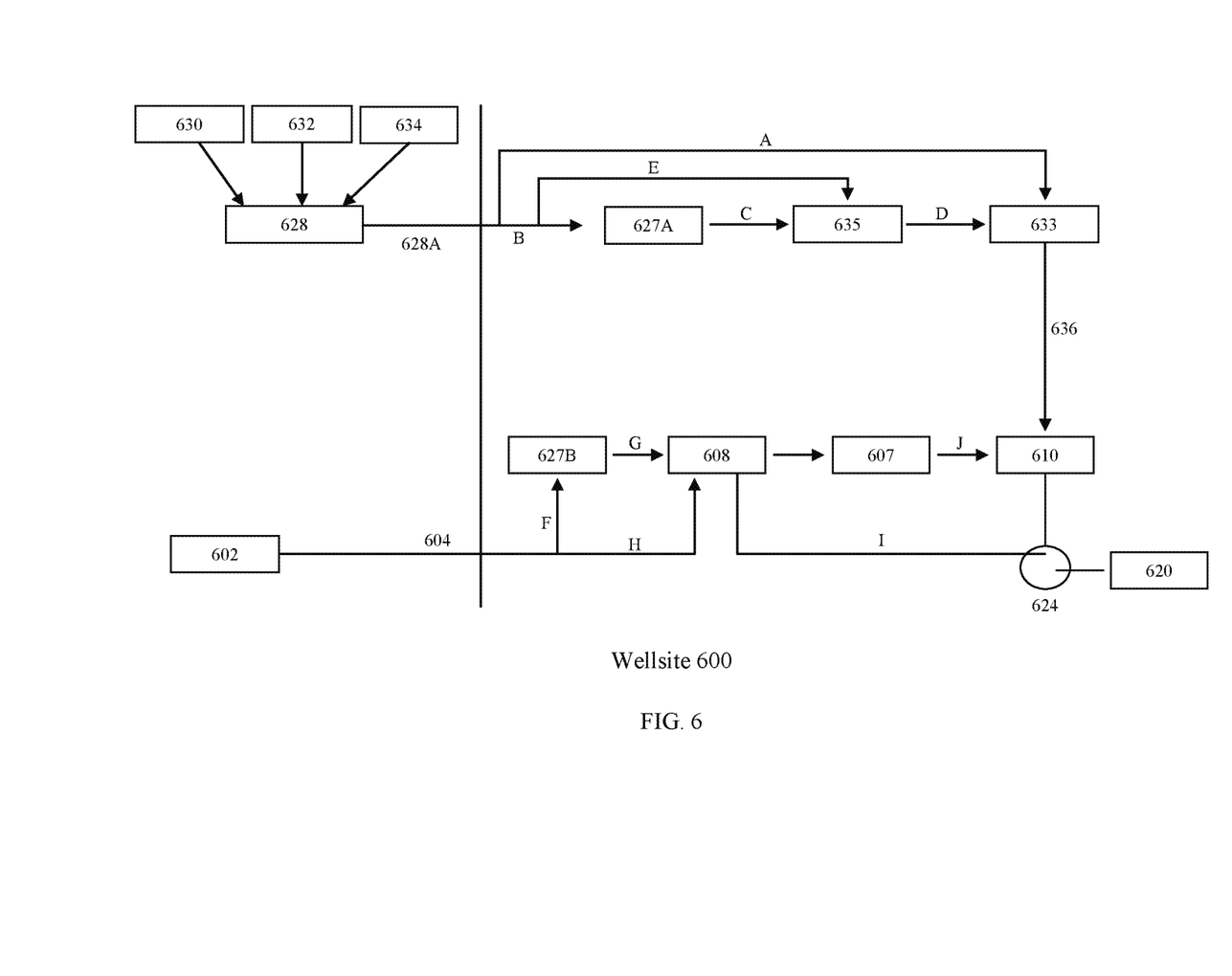

FIG. 6 illustrates various alternatives for placement of one or more separator(s), storage vessel(s) (for treated or untreated natural gas), natural gas compressor(s) and/or mixer(s) gas at the wellsite.

Referring to FIG. 6, natural gas 628A may be delivered onto wellsite 600 from central gathering unit 628 where natural gas from gas producing well 630, gas producing well 632 and gas producing well 634 is collected. All or a portion of the gas stream may then be fed into separator 627A to remove water, dust, heavy hydrocarbons and other gases. All or a portion of the treated gas may then be passed into storage tank 635 and, when needed, fed into blender 610 via metering device 633 as stream 636. Alternatively, all or a portion of the treated gas may be fed from separator 627A into metering device 633. The storage tank may be regulated by an inert tank valve for regulating the flow of the natural gas. The storage tank may also contain a vaporizer for maintaining vapor pressures and reduce line pressure drops.

All or a portion of gas stream 628A may further be fed directly into storage tank 635 and/or fed directly into blender 610 via metering device 633.

All a portion of the natural gas 604 from secondary gas producing well 602 may be fed into separator 627B to remove the undesirable components and then passed into storage tank 608. As depicted, all or a portion of natural gas stream 604 may be fed into storage tank 608 directly. FIG. 6 illustrates two storage tanks for natural gas though it is understood that there may be only one storage tank at the wellsite or there may be more than two storage tanks at the wellsite. Likewise, there may be one or multiple separators and blenders at the wellsite.

From storage tank 608, the natural gas may be metered into blender 610 via metering device 607 and then admixed with gellant and/or foaming agent and, optionally, proppant. Proppant may further be supplied directly from a proppant storage tank into the wellhead. Alternatively, or in addition, natural gas from storage tank 608 may be fed directly into wellhead 620 via pump 624.

Further, all or a portion of natural gas 604 in storage tank 608 may be fed directly into wellhead 620 via pump 624.

In a preferred embodiment, natural gas (either untreated or treated) is compressed to form foamed gas or energized natural gas. FIG. 6 shows exemplary locations at which natural gas may be compressed. Referring to FIG. 6, one or more natural gas compression units may be located at the wellsite such as, for example, between (i) the port of entry of natural gas stream 628A from central gathering unit 628 and metering device 633, labeled as "A"; (ii) the port of entry of natural gas stream 628A and separator 627A, labeled as "B"; separator 627A and storage tank 635, labeled as "C"; storage tank 635 and metering device 633, labeled as "D"; the port of entry of natural gas stream 628A and storage tank 635, labeled as "E"; the port of entry of natural gas stream 604 and separator 627B, labeled as "F"; separator 627B and storage tank 608, labeled as "G"; the port of entry of natural gas stream 604 and storage tank 608, labeled as "H"; storage tank 608 and pump 620, labeled as "I"; and storage tank 608 and metering device 607, labeled as "J".

Suitable proppants for use in the disclosure include those conventionally known in the art such as quartz, sand grains, glass beads, aluminum pellets, ceramics, plastic beads and ultra lightweight (ULW) particulates such as ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc. Further the proppant may include porous ceramics or organic polymeric particulates. The porous particulate material may be treated with a non-porous penetrating material, coating layer or glazing layer. The amount of proppant in the foamed gas or energized fluid is typically between from about 0.5 to about 12.0, preferably between from about 1 to about 8.0, pounds of proppant per gallon of fluid.

A pad fluid may precede the introduction of the foamed gas or energized fluid into the wellhead. The pad fluid may be a gaseous fluid and introduced into the formation at a pressure sufficient to initiate a fracture. The pad fluid is preferably composed entirely of natural gas. The pad fluid may further contain one or more proppants.

The fluid containing LNG described herein may further be used in a sand control treatment operation of a gas producing well. The "proppant" referenced herein would be used as the sand control particulate. In one exemplary embodiment, a gravel pack operation may be carried out on a wellbore that penetrates a subterranean formation to prevent or substantially reduce the production of formation particles into the wellbore from the formation during gas production. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. The LNG containing the sand control particulate may be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during the production of gas from the formation, while at the same time allowing passage of formation fluids from the subterranean formation through the screen into the wellbore. The fluid is typically gelled.

As an alternative to use of a screen, the sand control method may use the lightweight polyamide and/or substantially neutrally buoyant particulates in accordance with any method in which a pack of particulate material is formed within a wellbore that it is permeable to gas produced from a wellbore but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

The method of using natural gas and LNG as disclosed herein is especially useful in well treatment operations of coal bed methane formations and tight formations (including tight gas shale reservoirs exhibiting complex natural fracture networks). To effectively access such formations, the well is often drilled horizontally and then subjected to one or more fracture treatments to stimulate production.

While exemplary embodiments of the disclosure have been shown and described, variations, modifications and/or changes of the methods of the present disclosure are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

Although the foregoing description contains many specifics, these are not to be construed as limiting the scope of the disclosure, but merely as providing certain embodiments. Similarly, other embodiments may be devised that do not depart from the scope of the disclosure. For example, features described herein with reference to one embodiment also may be provided in others of the embodiments described herein. The scope of the disclosure is, therefore, indicated and limited only by the appended claims and their legal equivalents, rather than by the foregoing description. All additions, deletions, and modifications to embodiments of the disclosure, as described and illustrated herein, which fall within the meaning and scope of the claims, are encompassed by the disclosure.

What is claimed is:

1. A method of treating a subterranean formation penetrated by a well comprising pumping a gelled foamed or energized non-aqueous fluid into the subterranean formation, the gelled foamed or energized fluid formulated from natural gas and a non-aqueous based fluid comprising a gellant wherein at least one of the following conditions prevail:
   (a) the gelled foamed or energized fluid further comprises proppant;
   (b) the well is a gas well or oil well and the subterranean formation contains coal or shale;
   (c) the natural gas is compressed natural gas; or
   (d) the natural gas in the foamed or energized fluid is in an amount sufficient to provide a foam quality between from about 30 to about 99.9%.

2. The method of claim 1, wherein the natural gas originates from a gas producing well located at the wellsite of the well penetrating the subterranean formation.

3. The method of claim 1, wherein the natural gas in the foamed fluid is in an amount sufficient to provide a foam quality from 53% to 99.9%.

4. The method of claim 3, wherein the natural gas in the foamed fluid is in an amount sufficient to provide a foam quality greater than or equal to 90%.

5. The method of claim 1, wherein the foamed or energized fluid is further formulated with a foaming agent other than natural gas.

6. The method of claim 1, wherein the gellant is oil-based.

7. The method of claim 6, wherein the oil-based gellant is a phosphate ester.

8. The method of claim 6, wherein the oil-based gellant is an oil.

9. The method of claim 6, wherein the oil-based gellant is diesel fuel.

10. The method of claim 1, the natural gas comprising the foamed or energized fluid being supplied into the well at the wellhead either from:
    (a) a gas producing well via a flowline extending from a producing well to the well penetrating the hydrocarbon-bearing formation;
    (b) a field gathering unit;
    (c) a pipeline plumbed to the wellsite of the well penetrating the hydrocarbon-bearing formation;
    (d) a storage tank on the wellsite of the well penetrating the hydrocarbon-bearing formation; or
    (e) a central gathering unit.

11. A method for enhancing productivity of a hydrocarbon-bearing formation penetrated by a well comprising introducing a foamed or energized fluid having a foam quality from 53 to about 99.9 percent into the hydrocarbon-bearing subterranean formation penetrated by the well, the foamed or energized fluid formulated by mixing natural gas and a non-aqueous based fluid wherein the foamed or energized fluid is further formulated with a phosphate ester gellant or a foaming agent other than natural gas and wherein the natural gas is supplied into the well at the wellhead either from:
    (a) a gas producing well via a flowline extending from a producing well to the well penetrating the hydrocarbon-bearing formation;
    (b) a field gathering unit;
    (c) a pipeline plumbed to the wellsite of the well penetrating the hydrocarbon-bearing formation;
    (d) a storage tank on the wellsite of the well penetrating the hydrocarbon-bearing formation; or
    (e) a central gathering unit.

12. The method of claim 11, wherein the natural gas in the foamed or energized fluid is in an amount sufficient to provide a foam quality greater than or equal to 90%.

13. A method of treating a subterranean formation penetrated by a well which comprises:
    (a) formulating a foamed or energized fluid by mixing natural gas and a non-aqueous based fluid or aqueous based fluid wherein the natural gas in the foamed or energized fluid is in an amount sufficient to provide a foam quality between from about 30 to about 99.9%; and
    (b) introducing the foamed or energized fluid into the subterranean formation and further wherein:
       (a) the foamed or energized fluid is formulated with a gellant selected from the group consisting of galactomannan gums, cellulose and cellulose derivatives, starch, starch derivatives, xanthan, derivatized xanthan and mixtures thereof; or
       (b) the foamed or energized fluid is further formulated with a crosslinking agent.

14. The method of claim 13, wherein the crosslinking agent contains a metal selected from the group consisting of aluminum, zirconium and titanium and mixtures thereof.

15. The method of claim 13, wherein the natural gas is compressed natural gas.

16. The method of claim 13, wherein the natural gas of the foamed or energized fluid is supplied into the well at the wellhead from:
    (a) a gas producing well via a flowline extending from a producing well to the well penetrating the hydrocarbon-bearing formation;
    (b) a field gathering unit;
    (c) a pipeline plumbed to the wellsite of the well penetrating the hydrocarbon-bearing formation;
    (d) a storage tank on the wellsite of the well penetrating the hydrocarbon-bearing formation; or
    (e) a central gathering unit.

* * * * *